United States Patent
Ha et al.

(10) Patent No.: US 9,690,606 B1
(45) Date of Patent: Jun. 27, 2017

(54) SELECTIVE SYSTEM CALL MONITORING

(71) Applicant: FireEye, Inc., Milpitas, CA (US)

(72) Inventors: Phung-Te Ha, Dublin, CA (US); Wei Xu, Dublin, CA (US)

(73) Assignee: FireEye, Inc., Milpitas, CA (US)

( * ) Notice: Subject to any disclaimer, the term of this patent is extended or adjusted under 35 U.S.C. 154(b) by 29 days.

(21) Appl. No.: 14/668,601

(22) Filed: Mar. 25, 2015

(51) Int. Cl.
*G06F 9/455* (2006.01)
*G06F 21/56* (2013.01)

(52) U.S. Cl.
CPC .......... *G06F 9/45533* (2013.01); *G06F 21/56* (2013.01); *G06F 2221/034* (2013.01)

(58) Field of Classification Search
CPC .......... G06F 9/45533; G06F 21/56; G06F 2221/034; G06F 21/566; G06F 21/53; G06F 9/455; G06F 21/554
See application file for complete search history.

(56) References Cited

U.S. PATENT DOCUMENTS

| | | | |
|---|---|---|---|
| 4,292,580 A | 9/1981 | Ott et al. |
| 5,175,732 A | 12/1992 | Hendel et al. |
| 5,440,723 A | 8/1995 | Arnold et al. |
| 5,490,249 A | 2/1996 | Miller |
| 5,657,473 A | 8/1997 | Killean et al. |
| 5,842,002 A | 11/1998 | Schnurer et al. |
| 5,978,917 A | 11/1999 | Chi |
| 6,088,803 A | 7/2000 | Tso et al. |
| 6,094,677 A | 7/2000 | Capek et al. |
| 6,108,799 A | 8/2000 | Boulay et al. |
| 6,118,382 A | 9/2000 | Hibbs et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,417,774 B1 | 7/2002 | Hibbs et al. |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

"Network Security: NetDetector—Network Intrusion Forensic System (NIFS) Whitepaper", ("NetDetector Whitepaper"), (2003).

(Continued)

*Primary Examiner* — Catherine Thiaw
(74) *Attorney, Agent, or Firm* — Rutan & Tucker, LLP

(57) ABSTRACT

According to one embodiment of the invention, a computerized method is described for improved efficiency in malware detection. The method comprises detecting a system call initiated by a virtual machine and determining a class assigned to the detected system call. In response to determining that the system call is associated with a first class of system calls, providing information associated with the system call to virtualized device hardware. In contrast, in response to determining that the system call is associated with a second class of system calls, which is different from the first class of system calls, the virtual machine resumes virtual processing of an object without providing information to the virtualized device hardware.

37 Claims, 5 Drawing Sheets

(56) References Cited

U.S. PATENT DOCUMENTS

| | | |
|---|---|---|
| 6,424,627 B1 | 7/2002 | Sørhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,700,497 B2 | 3/2004 | Hibbs et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 6,995,665 B2 | 2/2006 | Appelt et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,290,763 B1 * | 10/2012 | Zhang .................... G06F 9/455 703/26 |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |

(56) References Cited

U.S. PATENT DOCUMENTS

| | | |
|---|---|---|
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,282 B1 | 11/2014 | Aziz et al. |
| 8,898,788 B1 | 11/2014 | Aziz et al. |
| 8,935,779 B2 | 1/2015 | Manni et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,694 B2 | 8/2015 | Aziz et al. |
| 9,118,715 B2 | 8/2015 | Staniford et al. |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0169194 A1 | 7/2007 | Church et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |

(56) References Cited

U.S. PATENT DOCUMENTS

| | | |
|---|---|---|
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0028463 A1 | 1/2008 | Dagon et al. |
| 2008/0032556 A1 | 2/2008 | Schreier |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0229239 A1* | 9/2010 | Rozenberg ............ G06F 21/552 726/24 |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | Ståhlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0083186 A1 | 4/2011 | Niemela et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |

(56) References Cited

U.S. PATENT DOCUMENTS

| | | | |
|---|---|---|---|
| 2013/0111587 A1 | 5/2013 | Goel et al. | |
| 2013/0111593 A1* | 5/2013 | Shankar | G06F 21/54 726/25 |
| 2013/0117852 A1 | 5/2013 | Stute | |
| 2013/0117855 A1 | 5/2013 | Kim et al. | |
| 2013/0139264 A1 | 5/2013 | Brinkley et al. | |
| 2013/0160125 A1 | 6/2013 | Likhachev et al. | |
| 2013/0160127 A1 | 6/2013 | Jeong et al. | |
| 2013/0160130 A1 | 6/2013 | Mendelev et al. | |
| 2013/0160131 A1 | 6/2013 | Madou et al. | |
| 2013/0167236 A1 | 6/2013 | Sick | |
| 2013/0174214 A1 | 7/2013 | Duncan | |
| 2013/0185789 A1 | 7/2013 | Hagiwara et al. | |
| 2013/0185795 A1 | 7/2013 | Winn et al. | |
| 2013/0185798 A1 | 7/2013 | Saunders et al. | |
| 2013/0191915 A1 | 7/2013 | Antonakakis et al. | |
| 2013/0196649 A1 | 8/2013 | Paddon et al. | |
| 2013/0227691 A1 | 8/2013 | Aziz et al. | |
| 2013/0246370 A1 | 9/2013 | Bartram et al. | |
| 2013/0263260 A1 | 10/2013 | Mahaffey et al. | |
| 2013/0291109 A1 | 10/2013 | Staniford et al. | |
| 2013/0298243 A1 | 11/2013 | Kumar et al. | |
| 2013/0326625 A1* | 12/2013 | Anderson | G06F 21/56 726/23 |
| 2014/0053260 A1 | 2/2014 | Gupta et al. | |
| 2014/0053261 A1 | 2/2014 | Gupta et al. | |
| 2014/0130158 A1 | 5/2014 | Wang et al. | |
| 2014/0137180 A1 | 5/2014 | Lukacs et al. | |
| 2014/0169762 A1 | 6/2014 | Ryu | |
| 2014/0179360 A1 | 6/2014 | Jackson et al. | |
| 2014/0328204 A1 | 11/2014 | Klotsche et al. | |
| 2014/0337836 A1 | 11/2014 | Ismael | |
| 2014/0351935 A1 | 11/2014 | Shao et al. | |
| 2015/0096025 A1 | 4/2015 | Ismael | |
| 2015/0121135 A1* | 4/2015 | Pape | G06F 11/1484 714/15 |
| 2016/0164946 A1* | 6/2016 | Bazzi | H04L 67/02 709/219 |

FOREIGN PATENT DOCUMENTS

| | | |
|---|---|---|
| WO | 0206928 | 1/2002 |
| WO | 0223805 A2 | 3/2002 |
| WO | 2007117636 A2 | 10/2007 |
| WO | 2008041950 A2 | 4/2008 |
| WO | 2011084431 A2 | 7/2011 |
| WO | 2011/112348 A1 | 9/2011 |
| WO | 2012/075336 A1 | 6/2012 |
| WO | 2012145066 A1 | 10/2012 |
| WO | 2013/067505 A1 | 5/2013 |

OTHER PUBLICATIONS

"Packet", Microsoft Computer Dictionary Microsoft Press, (Mar. 2002), 1 page.

"When Virtual is Better Than Real", IEEEXplore Digital Library, available at, http://ieeexplore.ieee.org/xpl/articleDetails.jso?reload=true&arnumber=990073, (Dec. 7, 2013).

Abdullah, et al., Visualizing Network Data for Intrusion Detection, 2005 IEEE Workshop on Information Assurance and Security, pp. 100-108.

Adetoye, Adedayo, et al., "Network Intrusion Detection & Response System", ("Adetoye") (Sep. 2003).

Adobe Systems Incorporated, "PDF 32000-1:2008, Document management—Portable document format—Part1:PDF 1.7", First Edition, Jul. 1, 2008, 756 pages.

AltaVista Advanced Search Results. "attack vector identifier" Http://www.altavista.com/web/results?Itag=ody&pg=aq&aqmode=aqa=Event+Orchestrator . . . , (Accessed on Sep. 15, 2009).

AltaVista Advanced Search Results. "Event Orchestrator". Http://www.altavista.com/web/results?Itag=ody&pg=aq&aqmode=aqa=Event+Orchesrator . . . , (Accessed on Sep. 3, 2009).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

Aura, Tuomas, "Scanning electronic documents for personally identifiable information", Proceedings of the 5th ACM workshop on Privacy in electronic society. ACM, 2006.

Aziz, Ashar, System and Method for Malware Containment, U.S. Appl. No. 14/620,060, filed Feb. 11, 2015, non-Final Office Action dated Apr. 3, 2015.

Baecher, "The Nepenthes Platform: An Efficient Approach to collect Malware", Springer-verlaq Berlin Heidelberg, (2006), pp. 165-184.

Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.

Bayer, et al., "Dynamic Analysis of Malicious Code", J Comput Virol, Springer-Verlag, France., (2006), pp. 67-77.

Boubalos, Chris , "Extracting syslog data out of raw pcap dumps, seclists.org, Honeypots mailing list archives", available at http://seclists,org/honeypots/2003/q2/319 ("Boubalos"), (Jun. 5, 2003).

Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.

Cisco "Intrusion Prevention for the Cisco ASA 5500-x Series" Data Sheet (2012).

Cisco, Configuring the Catalyst Switched Port Analyzer (SPAN) ("Cisco"), (1992-2003).

Clark, John, Sylvian Leblanc,and Scott Knight. "Risks associated with usb hardware trojan devices used by insiders." Systems Conference (SysCon), 2011 IEEE International. IEEE, 2011.

Cohen, M.I., "PyFlag—An advanced network forensic framework", Digital investigation 5, Elsevier, (2008), pp. S112-S120.

Costa, M., et al., "Vigilante: End-to-End Containment of Internet Worms", SOSP '05 Association for Computing Machinery, Inc., Brighton U.K., (Oct. 23-26, 2005).

Crandall, J.R., et al., "Minos:Control Data Attack Prevention Orthogonal to Memory Model", 37th International Symposium on Microarchitecture, Portland, Oregon, (Dec. 2004).

Deutsch, P., ""Zlib compressed data format specification version 3.3" RFC 1950, (1996)".

Distler, "Malware Analysis: An Introduction", SANS Institute InfoSec Reading Room, SANS Institute, (2007).

Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).

Excerpt regarding First Printing Date for Merike Kaeo, Designing Network Security ("Kaeo"), (2005).

Filiol, Eric , et al., "Combinatorial Optimisation of Worm Propagation on an Unknown Network", International Journal of Computer Science 2.2 (2007).

FireEye Malware Analysis & Exchange Network, Malware Protection System, FireEye Inc., 2010.

FireEye Malware Analysis, Modern Malware Forensics, FireEye Inc., 2010.

FireEye v.6.0 Security Target, pp. 1-35, Version 1.1, FireEye Inc., May 2011.

Gibler, Clint, et al. AndroidLeaks: automatically detecting potential privacy leaks in android applications on a large scale. Springer Berlin Heidelberg, 2012.

Goel, et al., Reconstructing System State for Intrusion Analysis, Apr. 2008 SIGOPS Operating Systems Review vol. 42 Issue 3, pp. 21-28.

Gregg Keizer: "Microsoft's HoneyMonkeys Show Patching Windows Works", Aug. 8, 2005, XP055143386, Retrieved from the Internet: URL:https://web.archive.org/web/20121022220617/http://

(56) References Cited

OTHER PUBLICATIONS www.informationweek.com/microsofts-honeymonkeys-show-patching-wi/167600716 [retrieved on Sep. 29, 2014].

Heng Yin et al, Panorama: Capturing System-Wide Information Flow for Malware Detection and Analysis, Research Showcase @ CMU, Carnegie Mellon University, 2007.

Hjelmvik, Erik, "Passive Network Security Analysis with NetworkMiner", (IN)Secure, Issue 18, (Oct. 2008), pp. 1-100.

Idika et al., A-Survey-of-Malware-Detection-Techniques, Feb. 2, 2007, Department of Computer Science, Purdue University.

IEEE Xplore Digital Library Sear Results for "detection of unknown computer worms". Http//ieeexplore.ieee.org/searchresult. jsp?SortField=Score&SortOrder=desc&ResultC . . . (Accessed on Aug. 28, 2009).

Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.

Kaeo, Merike, "Designing Network Security", ("Kaeo"), (Nov. 2003).

Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.

Kim, H., et al., "Autograph: Toward Automated, Distributed Worm Signature Detection", Proceedings of the 13th Usenix Security Symposium (Security 2004), San Diego, (Aug. 2004), pp. 271-286.

Krasnyansky, Max, et al., Universal TUN/TAP driver, available at https://www.kernel.org/doc/Documentation/networking/tuntap.txt (2002) ("Krasnyansky").

Kreibich, C., et al., "Honeycomb-Creating Intrusion Detection Signatures Using Honeypots", 2nd Workshop on Hot Topics in Networks (HotNets-11), Boston, USA, (2003).

Kristoff, J., "Botnets, Detection and Mitigation: DNS-Based Techniques", NU Security Day, (2005), 23 pages.

Leading Colleges Select FireEye to Stop Malware-Related Data Breaches, FireEye Inc., 2009.

Li et al., A VMM-Based System Call Interposition Framework for Program Monitoring, Dec. 2010, IEEE 16th International Conference on Parallel and Distributed Systems, pp. 706-711.

Liljenstam, Michael, et al., "Simulating Realistic Network Traffic for Worm Warning System Design and Testing", Institute for Security Technology studies, Dartmouth College, ("Liljenstam"), (Oct. 27, 2003).

Lindorfer, Martina, Clemens Kolbitsch, and Paolo Milani Comparetti. "Detecting environment-sensitive malware." Recent Advances in Intrusion Detection. Springer Berlin Heidelberg, 2011.

Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/usenixsecurity12/sec12--final107.pdf [retrieved on Dec. 15, 2014].

Marchette, David J., Computer Intrusion Detection and Network Monitoring: A Statistical ("Marchette"), (2001).

Margolis, P. E., "Random House Webster's 'Computer & Internet Dictionary 3rd Edition", ISBN 0375703519, (Dec. 1998).

Moore, D., et al., "Internet Quarantine: Requirements for Containing Self-Propagating Code", INFOCOM, vol. 3, (Mar. 30-Apr. 3, 2003), pp. 1901-1910.

Morales, Jose A., et al., ""Analyzing and exploiting network behaviors of malware."", Security and Privacy in Communication Networks. Springer Berlin Heidelberg, 2010. 20-34.

Mod, Detecting Unknown Computer Viruses, 2004, Springer-Verlag Berlin Heidelberg.

Natvig, Kurt, "SandBoxII: Internet", Virus Bulletin Conference, ("Natvig"), (Sep. 2002).

NetBIOS Working Group. Protocol Standard for a NetBIOS Service on a TCP/UDP transport: Concepts and Methods. Std 19, RFC 1001, Mar. 1987.

Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).

Newsome, J., et al., "Polygraph: Automatically Generating Signatures for Polymorphic Worms", In Proceedings of the IEEE Symposium on Security and Privacy, (May 2005).

Nojiri, D. , et al., "Cooperation Response Strategies for Large Scale Attack Mitigation", DARPA Information Survivability Conference and Exposition, vol. 1, (Apr. 22-24, 2003), pp. 293-302.

Oberheide et al., CloudAV.sub.--N-Version Antivirus in the Network Cloud, 17th USENIX Security Symposium USENIX Security '08 Jul. 28-Aug. 1, 2008 San Jose, CA.

Peter M. Chen, and Brian D. Noble, "When Virtual is Better Than Real, Department of Electrical Engineering and Computer Science", University of Michigan ("Chen").

Reiner Sailer, Enriquillo Valdez, Trent Jaeger, Roonald Perez, Leendert van Doom, John Linwood Griffin, Stefan Berger., sHype: Secure Hypervisor Approach to Trusted Virtualized Systems (Feb. 2, 2005) ("Sailer").

Silicon Defense, "Worm Containment in the Internal Network", (Mar. 2003), pp. 1-25.

Singh, S., et al., "Automated Worm Fingerprinting", Proceedings of the ACM/USENIX Symposium on Operating System Design and Implementation, San Francisco, California, (Dec. 2004).

Spitzner, Lance, "Honeypots: Tracking Hackers", ("Spizner"), (Sep. 17, 2002).

The Sniffers's Guide to Raw Traffic available at: yuba.stanford.edu/~casado/pcap/sectionl.html, (Jan. 6, 2014).

Thomas H. Ptacek, and Timothy N. Newsham , "Insertion, Evasion, and Denial of Service: Eluding Network Intrusion Detection", Secure Networks, ("Ptacek"), (Jan. 1998).

U.S. Appl. No. 11/717,475, filed Mar. 12, 2007 Final Office Action dated Feb. 27, 2013.

U.S. Appl. No. 11/717,475, filed Mar. 12, 2007 Final Office Action dated Nov. 22, 2010.

U.S. Appl. No. 11/717,475, filed Mar. 12, 2007 Non-Final Office Action dated Aug. 28, 2012.

U.S. Appl. No. 11/717,475, filed Mar. 12, 2007 Non-Final Office Action dated May 6, 2010.

U.S. Appl. No. 14/059,381, filed Oct. 21, 2013 Non-Final Office Action dated Oct. 29, 2014.

U.S. Pat. No. 8,171,553 filed Apr. 20, 2006, Inter Parties Review Decision dated Jul. 10, 2015.

U.S. Pat. No. 8,291,499 filed Mar. 16, 2012, Inter Parties Review Decision dated Jul. 10, 2015.

Venezia, Paul, "NetDetector Captures Intrusions", InfoWorld Issue 27, ("Venezia"), (Jul. 14, 2003).

Wahid et al., Characterising the Evolution in Scanning Activity of Suspicious Hosts, Oct. 2009, Third International Conference on Network and System Security, pp. 344-350.

Whyte, et al., "DNS-Based Detection of Scanning Works in an Enterprise Network", Proceedings of the 12th Annual Network and Distributed System Security Symposium, (Feb. 2005), 15 pages.

Williamson, Mathew M., "Throttling Virses: Restricting Propagation to Defeat Malicious Mobile Code", ACSAC Conference, Las Vegas, NV, USA, (Dec. 2002), pp. 1-9.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

* cited by examiner

SELECTIVE SYSTEM CALL MONITORING

FIELD

Embodiments of the disclosure relate to the field of cyber security. More specifically, embodiments of the disclosure relate to a system and computerized method that detects a system call during processing of an object by one or more virtual machines and classifies the detected system call, where the assigned classification at least partially controls the manner in which further virtual processing of that detected system call is conducted.

GENERAL BACKGROUND

Malware detection systems often employ virtual environments to enable potentially malicious objects to be safely analyzed during run-time in one or more sandboxed virtual machines. Each virtual machine is provisioned with a guest image, where the guest image is configured in accordance with a particular software profile. This particular software profile is dependent on the type of object being analyzed. For example, where the object is an accessed web page, the software profile may prescribe a browser application that runs over a specific operating system (e.g., Windows®, Linux®, etc.). As another example, where the object is an electronic message, the software profile may prescribe an email application running over the same or a different operating system (e.g., Microsoft® Mobile®, Blackberry® OS, etc.).

For processing a suspicious object, the virtual machine is provisioned with a guest image that features software components for the prescribed software profile. Typically, during virtual processing, the suspicious object may cause a software application associated with the guest image to initiate a system call that requests a service from the guest operating system (OS). The service may include a hardware-related service (e.g., accessing a hard disk drive, etc.). According to certain conventional security architectures, all system calls are intercepted by a virtual machine monitor (VMM), which is operating in kernel mode. Thereafter, the parameters associated with the system call are subsequently passed to virtual machine memory inspection logic (VMMI), which monitors behaviors (e.g., activities and/or omissions) conducted by virtualized device hardware in the processing of an instruction pertaining to the system call. Stated differently, the VMM passes control of the virtual processing to the VMMI, which is operating in user mode.

This conventional system call monitoring process features a few disadvantages. One disadvantage is that the amount of processing time required for conducting a context switch in passing parameters associated with the system call (from the VMM operating in the kernel mode to the VMMI operating in the user mode) is substantial which may impact performance of the malware detection system.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
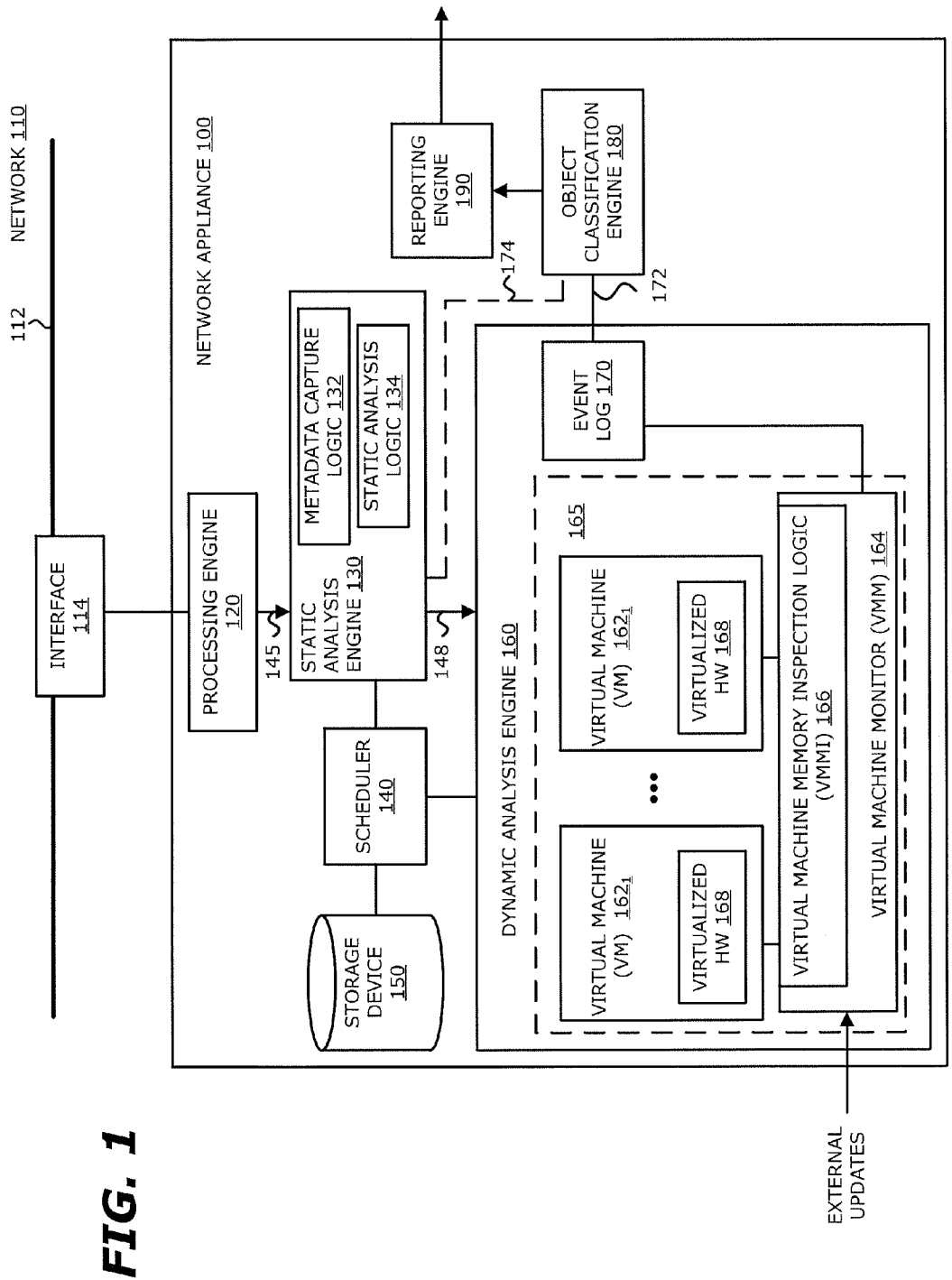
FIG. 1 is an exemplary block diagram of a network appliance with system call classification handled by a virtual machine monitor (VMM) as described herein.

Various embodiments of the disclosure relate to a system and computerized method that detects a system call during processing of an object by one or more virtual machines and classifies the detected system call. The assigned classification may be used to control whether or not the handling of the detected system call is conducted by virtualized device hardware targeted by the system call. Hence, by classifying the system call and controlling the handling of these system calls, the monitoring of guest operating system (OS) activity may be controlled.

A system call includes a request to the OS kernel for a service. Normally, the OS kernel manages input/output (I/O) requests from software and translates these requests into data processing instructions for a central processing unit (CPU) or other electronic components. The service may include hardware-related services (e.g., access to a storage device such as a hard disk drive), or process management (e.g., creation, termination, scheduling of a process). In a virtual analysis environment, a system call may be initiated from a process running on a virtual machine (VM). A virtual machine monitor (VMM), also referred to as a hypervisor, manages VM operability, including processing of the guest OS, and is configured to detect and control the handling of system calls through call classification.

Herein, system calls may be classified into a plurality of classes. According to one embodiment of the disclosure, these classes may include (1) a first class that features a first set of system calls (sometimes referred to as "system-wide" system calls), and (2) a second class that features a second set of system calls (sometimes referred to as "process-specific" system calls). It is contemplated that there is no specific set of system calls that are necessary to the implementation of the invention, as the illustrative system calls for a selected class may be dynamic in nature based on the security threat landscape.

According to one embodiment of the disclosure, "system-wide" system calls represent selected system calls that tend to occur during malicious attacks, but are less processing intensive and/or less frequently initiated than other types of system calls. "Process-specific" system calls represent selected system calls that tend to involve behaviors that may be more susceptible to malicious attacks for that particular process.

When the detected system call is a member of the first class (and in some cases the second class), the detected system call is serviced by virtualized device hardware and activities associated with the virtual processing of the detected system call by the virtualized device hardware are monitored by virtual machine memory inspection logic (VMMI) residing in the VMM. Similarly, when the detected system call is a member of the second class and the process initiating the detected system call has been identified as "suspicious" (e.g., activities of the process suggests that the process is associated with a malicious attack), the detected system call is serviced by virtualized device hardware and activities associated with the virtual processing of the detected system call by the virtualized device hardware are monitored by the VMMI.

For instance, in some deployments of the network appliance, VMMI monitors virtual processing of system-wide system calls by the virtualized device hardware, regardless of the process from which the system-wide system calls originated. Additionally, the VMMI monitors virtual processing of process-specific system calls where the process has been identified as suspicious. These process-specific system calls are applicable to all of the suspicious processes.

For other deployments, the VMMI monitors virtual processing of system-wide system calls by the virtualized device hardware, regardless of the process from which the system-wide system calls originated. The VMMI monitors virtual processing of the process-specific system calls (where the process has been identified as suspicious), but the process-specific system calls are selected for each type of process. As a result, the process-specific system calls may vary, in part or in total, from one categorized process to another categorized process. This deployment would allow the network appliance to concentrate resources in monitoring for different system calls among the processes, such as those system calls with a higher likelihood of being associated with a malicious attack for that particular process.

According to one embodiment of the disclosure, the VMMI will not monitor the second set of system calls (e.g., process-specific system calls) in its classification of a detected system call from a particular process until a triggering event occurs. In response to the triggering event, the VMMI now classifies the detected system call based on both the first and second sets of system calls. An example of a triggering event may include detecting a "system-wide" system call previously initiated by the particular (first) process during virtual processing of the object under analysis within the virtual machine. Another example of a triggering event may include detecting a "system-wide" system call which was previously initiated by another (second) process and created the particular (first) process. Hence, at a minimum, the first process is deemed to be suspicious.

I. TERMINOLOGY

In the following description, certain terminology is used to describe aspects of the invention. For example, in certain situations, terms "logic," "component" and "engine" are representative of hardware, firmware and/or software that is configured to perform one or more functions. As hardware, logic (or component or engine) may include circuitry having data processing or storage functionality. Examples of such processing or storage circuitry may include, but is not limited or restricted to a processor; one or more processor cores; a programmable gate array; a microcontroller; an application specific integrated circuit; receiver, transmitter and/or transceiver circuitry; semiconductor memory; or combinatorial logic, or combinations of one or more of the above components.

Logic (or component or engine) may be in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of a "non-transitory storage medium" may include, but are not limited or restricted to a programmable circuit; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device; and/or a semiconductor memory. As firmware, the executable code is stored in persistent storage.

The term "object" generally refers to a collection of data, whether in transit (e.g., over a network) or at rest (e.g., stored), often having a logical structure or organization that enables it to be classified for purposes of analysis. During analysis, for example, the object may exhibit a set of expected behaviors. The object may also exhibit a set of unexpected behaviors systematic of malicious activity that may provide evidence that the object may be classified as malicious.

In general, a "process" is an instance of software that is executed, in a virtual environment, for processing of an object under analysis. Each process may include one or more threads of execution ("threads"). For a multi-thread deployment, it is contemplated that each thread may be responsible for processing an object under analysis. The threads may operate successively or concurrently (e.g., at least partially overlapping in time) within the process, and share state information, memory and other process resources.

A "virtual machine" generally refers to an operating system (OS) or application environment that is virtualized and operates with virtualized device hardware, which may be different from the device on which the virtualization is conducted. Virtual machines may be based on specifications of a hypothetical computer or emulate the computer architecture and functions of a real world computing device.

A "network appliance" generally refers to an electronic device which network connectivity that typically includes a housing that protects, and sometimes encases, circuitry with data processing and/or data storage. Examples of a network appliance may include a server or an endpoint device that may include, but is not limited or restricted to a stationary or portable computer including a desktop computer, laptop, electronic reader, netbook or tablet; a wireless or wired access point; a router or other signal propagation networking equipment; a smart phone; a video-game console; or wearable technology (e.g., watch phone, etc.).

The term "transmission medium" is a physical or logical communication path with an endpoint device. For instance, the communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

The term "computerized" generally represents that any corresponding operations are conducted by hardware in combination with software and/or firmware.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. GENERAL ARCHITECTURES AND METHODS OF OPERATIONS

Referring to FIG. 1, an exemplary block diagram of a network appliance 100 deploying within a network 110 is shown. As shown, the network appliance 100 comprises a processing engine 120, a static analysis engine 130, a scheduler 140, a storage device 150, a dynamic analysis engine 160, an object classification engine 180, and/or a reporting engine 190 with an optional user interface capability.

According to one embodiment, the network appliance 100 is adapted to analyze received objects for malware, where a portion of the analysis is directed to detecting and classifying system calls (sometimes referred to as "syscalls") initiated by a process that is commenced during virtual processing of the received object within a sandboxed environment. The rules and/or parameters used in classifying the detected system call may be updated (e.g., upload new rules or modified rules, delete rules, modify parameters that are utilized by the rules) within a virtual machine monitor (VMM), which manages virtual processing of received objects that are deemed to be "suspicious" when loaded into the dynamic analysis engine 160 for further analysis.

As shown in FIG. 1, the network appliance 100 is an electronic device that is adapted to analyze information associated with incoming data (e.g., data over a transmission medium 112 that is part of the network 110. The incoming data may be directed from/to one or more endpoint devices (not shown) via any type of transmission medium 112, such as data routed via a wireless channel from a server, data routed via a wired cable coupled to the server or any device with storage capability, data routed via a combination of wired and wireless mediums, or the like. As this illustrative embodiment, the network 110 may include a public network such as the Internet, a private network (e.g., a local area network "LAN", wireless LAN, etc.), or a combination thereof.

Although not shown, the network appliance 100 may be communicatively coupled with the network 110 via an interface 114 operating as a data capturing device. According to one embodiment of the disclosure, the interface 114 is configured to receive the incoming data and provide information associated with the received incoming data to the network appliance 100. For instance, the interface 114 may operates a network tap that provides at least one or more objects (hereinafter "object(s)") extracted from network traffic propagating over the transmission medium 112. Alternatively, although not shown, the network appliance 100 may be configured to receive files or other objects that automatically (or on command), accessed from a storage system. As yet another alternative, the network appliance 100 may be configured to receive objects that are not provided over the network 110. For instance, as an illustrative example, the interface 114 may be a data capturing device (e.g., port) for receiving objects manually provided via a suitable dedicated communication link or from portable storage media such as a flash drive.

Metadata may accompany the object(s) for analysis. According to one embodiment of the disclosure, the metadata may be used, at least in part, to determine protocols, application types and other information that identifies characteristics of the object under analysis. The metadata may be used by logic (e.g., scheduler 140) within the network appliance 100 to select one or more software (guest) images that correspond to and include a particular software profile and which virtual machines $162_1$-$162_M$ are selected to be active or inactive. The software images are used to provision virtual machines $162_1$-$162_M$ (M≥1) within the dynamic analysis engine 160 according to a particular software profile. For instance, accessible by the scheduler 140, a plurality of different types of software images may be stored in a storage device 150, which correspond to a plurality of different types of software profiles. The software images can be updated via an external source (e.g., management system and/or cloud computing services) under a "push" or "pull" delivery scheme. These software images are used for configuring virtual machine(s) $162_1$-$162_M$ within the dynamic analysis engine 160.

In some embodiments, although not shown, interface 114 may be contained within the network appliance 100. In other embodiments, the interface 114 can be integrated into an intermediary device in the communication path (e.g., a firewall, router, switch or other networked electronic device) or can be a standalone component, such as an appropriate commercially available network tap.

As further shown in FIG. 1, a first embodiment of the network appliance 100 includes the processing engine 120, static analysis engine 130, scheduler 140, storage device 150, dynamic analysis engine 160, object classification engine 180, and reporting engine 190. Herein, according to one embodiment of the disclosure, the processing engine 120 receives a flow that features related information (e.g., data packets, etc.), including an object, and converts that object into a format, as need or appropriate, on which deep scanning by the static analysis engine 130 can be applied (see operations 1 & 2). This conversion and scanning may involve decompression of the object, decompilation of the object, extraction of specific data associated with the object, and/or emulation of the extracted data (like Javascript).

The static analysis engine 130 may include processing circuitry, such as one or more processors for example, which features metadata capture logic 132 and static analysis logic 134. For example, the metadata capture logic 132 is responsible for extracting and/or generating metadata contained with and/or associated with incoming data (e.g., network traffic). The metadata may be identified as being associated with a particular object 145 under analysis, and is temporarily stored. Examples of types of the metadata may include, but are not restricted or limited to information associated with the object such as object type. For example, code is an example of an object type, which may be in the form of an executable file or code embedded into another type of object. This metadata may be subsequently used for configuring one or more VMs $162_1$-$162_M$ within the dynamic analysis engine for virtual processing the object associated with that metadata.

In addition to, or in lieu of the metadata associated with the source of the object 145, it is contemplated that other types of metadata may be captured by metadata capture logic 132. For instance, these other types of metadata may include metadata associated with the destination targeted to receive the object 145. As examples, the metadata may include the device type or Media Access Control (MAC) address for the endpoint device, the particular software configuration of the endpoint device 130, or the like.

Referring still to FIG. 1, the static analysis logic 130 includes one or more software modules that, when executed by the controller(s), analyzes features for one or more incoming objects 145, which may be a portion of network traffic according to this embodiment of the disclosure (see operation 2). Such analysis may involve a static analysis of the features of each object under analysis to determine whether the object 145 is "suspicious," namely there exists a certain level of likelihood that the object 145 is associated with malware. This static analysis may include one or more checks being conducted on the object without its execution.

Examples of the checks may include signature matching to conduct (a) exploit signature checks, which may be adapted to compare at least a portion of the object under analysis with one or more pre-stored exploit signatures (pre-configured and predetermined attack patterns) from signature database (not shown), and/or (b) vulnerability signature checks that may be adapted to uncover deviations in messaging practices (e.g., non-compliance in communication protocols, message formats or ordering, and/or payload parameters including size). Other examples of these checks may include (i) heuristics, which is based on rules or policies as applied to the object and may determine whether one or more portions of the object under analysis is associated with an anomalous or suspicious characteristic (e.g., a particular URL associated with known exploits, or a particular source or destination address etc.) associated with known exploits; or (ii) determinative rule-based analysis that may include blacklist or whitelist checking.

Upon static analysis of the features of the object 145, the static analysis engine 130 determines whether this object 145 is "suspicious," namely the object 145 has features that suggest its association with a malicious attack. As a result, the static analysis engine 130 may route this suspicious object 148 (e.g., some or the entire analyzed object 145) to the dynamic analysis engine 160 for more in-depth analysis.

Figure 2A:
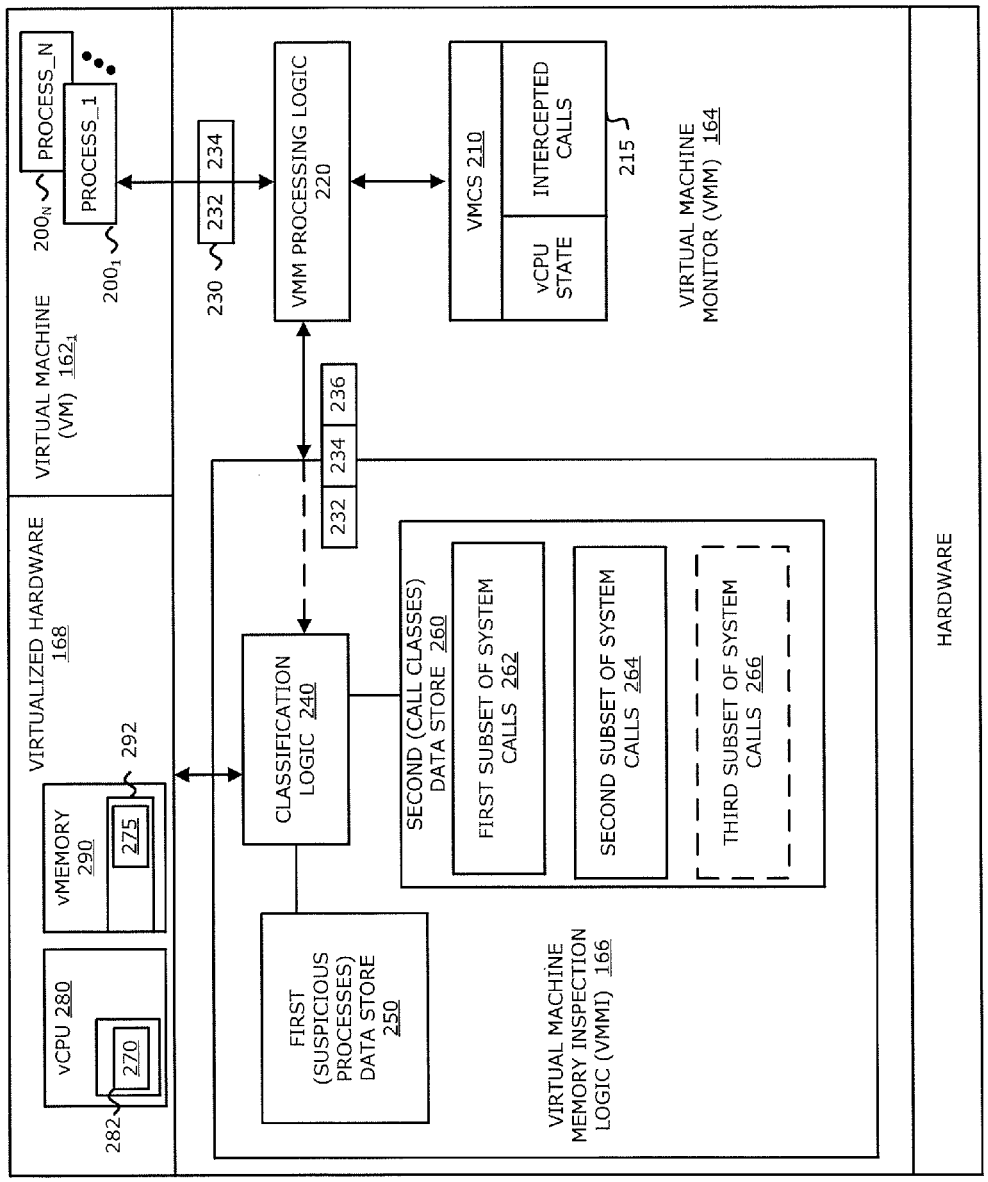
FIG. 2A is an exemplary block diagram of a first logical representation of the operability of a virtual machine, virtualized device hardware and the virtual machine monitor within the virtual execution logic as described herein.
Figure 2B:
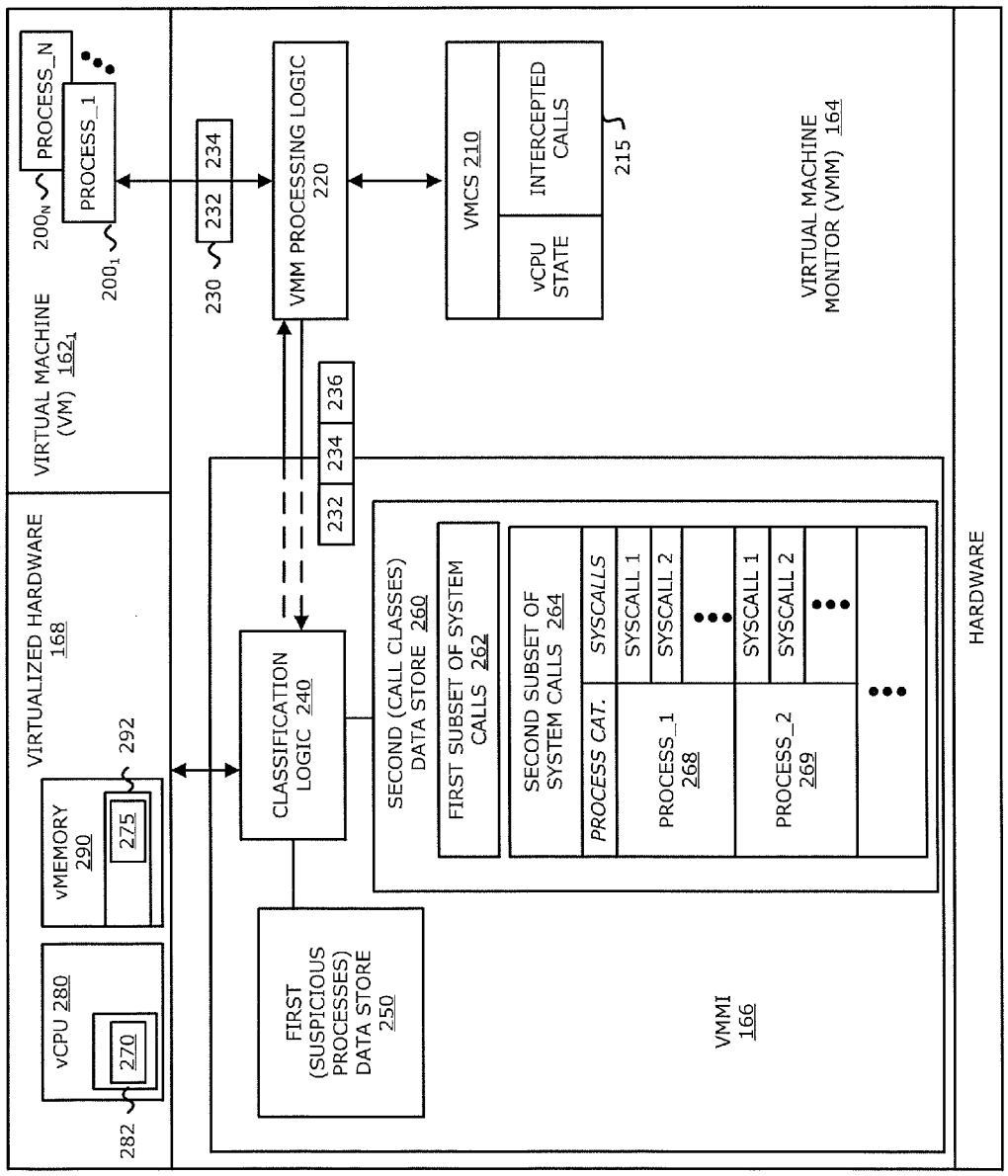
FIG. 2B is an exemplary block diagram of a second logical representation of the operability of the virtual machine, virtualized device hardware and the virtual machine monitor within the virtual execution logic as described herein.

More specifically, after analysis of the features of the object 145 has been completed, the static analysis engine 130 may provide the suspicious object 148 to the dynamic analysis engine 160 for in-depth dynamic analysis by VMs $162_1$-$162_M$ that is part of the virtual analysis environment 165 (see operation 4). Such analysis is illustrated in FIGS. 2A and 2B, described below in detail.

Referring still to FIG. 1, according to one embodiment, the scheduler 140 may be adapted to configure one or more VMs $162_1$-$162_M$, namely the first VM $162_1$ and the $M^{th}$ VM $162_M$ as shown, based on metadata associated with the suspicious object 148 (see operation 3). For instance, the VMs $162_1$-$162_M$ may be provisioned with software images stored within the storage device 150. These software images are configured with in accordance with certain software profiles. The software profiles may be directed to software components supplied by an enterprise and/or software components commonly utilized by endpoint devices within the enterprise (e.g., a certain version of Windows® OS; a certain version of a particular web browser such as Internet Explorer®; Adobe® PDF™ reader application; etc.). As yet another alternative embodiment, the software image may include a script that fetches the software components from a third party (e.g., software manufacturer, distributor, etc.). Of course, it is contemplated that the VM configuration described above may be handled by logic other than the scheduler 140 such as a virtual machine monitor (VMM) 164.

According to one embodiment of the disclosure, the dynamic analysis engine 160 may be adapted to execute one or more VMs $162_1$-$162_M$, which provides processing for the suspicious object 148 within a virtual run-time environment (see operation 4). For instance, dynamic analysis engine 160 comprises the VMM 164 operating in a kernel mode, which is configured to detect and classify system calls received from the VM(s) $162_1$-$162_M$ operating in a user mode. The "kernel mode" is a privileged mode, where a processor in this mode can access the entire address space, executes the entire instruction set (privileged and non-privileged instructions).

Additionally, the VMM 164 may emulate and/or provide anticipated signaling to the VM(s) $162_1$, . . . , and/or $162_M$ during virtual processing. As an example, the VMM 164 is configured to obtain information associated with the system call received from one of the VMs $162_1$-$162_M$ (e.g., VM $162_1$). For instance, when the VMM 164 detects of a system call, virtual machine memory inspection logic (VMMI) 166 that is part of the VMM 164 accesses certain portions of the virtualized device hardware (e.g., one or more registers of the virtual processor "vCPU", virtualized memory, etc.) to identify the type of system call detected. The VMMI 166 may obtain a system call identifier (e.g., a value that uniquely represents the system call) and/or additional parameters associated with the system call. It is contemplated that retrieval of the additional parameters may require address translations prior to accessing the additional parameters where the content associated with the parameters is referenced by address pointers.

Thereafter, the VMMI 166 is configured to classify the detected system call from the VMs $162_1$-$162_M$ to determine whether the system call is to be handled by the virtualized device hardware 168 (operating in the user mode). While switching from VM mode to VMM mode (sometimes referred to as "kernel mode") is not "expensive" from a processing time perspective, the context switching from kernel mode to user mode is expensive. Hence, system call classification may, in certain situations, avoid unnecessary processing of a system call by the virtualized device hardware 168.

Where the detected system call from a virtual machine (e.g., VM $162_1$) is part of a first set of system calls, one or more instructions associated with the detected system call are provided to the virtualized device hardware 168 and the resultant behaviors by the virtualized device hardware 168 are monitored and/or stored. After the virtualized device hardware 168 has completed such processing, the VMMI 166 signals the VMM 164 to issue a message that causes the VM $162_1$ to resume operations. The first set of system calls may include one or more system calls where system call hooking using the VMMI 166 is enabled for all processes in the guest OS.

Herein, according to one embodiment of the disclosure, the classification of system calls may be dynamic in nature based on the security threat landscape. For instance, the first set of system calls may represent "system-wide" system calls, namely selected system calls that tend to occur during malicious attacks, but are less processing intensive and/or less frequently initiated than other system calls. As a result, the monitoring of guest OS activity initiated by the first set of system calls does not warrant significant performance overhead. Examples of some of the first set of system calls may include, but are not limited to, certain system calls may be directed to (i) process control); (ii) certain file management system calls; and/or (iii) device management system calls such as input/output control that conducts device-specific input/output operations and other operations which cannot be expressed by regular system calls.

Given that the level of security threats may change on a weekly or daily basis and the particular system calls used by exploits may vary depending on the particular customers and/or its industry, the first set of system calls may be dynamic in nature with updates to the first set of system calls from external sources. This allows for some or all of the system calls to be added and/or removed on a periodic or aperiodic basis.

Where the detected system call from a particular process running on the VM 162₁ is one of the second set of the system calls and the particular process has already been determined to be suspicious, one or more instructions (sometimes referred to as "instruction(s)") associated with the detected system call is provided to the virtualized device hardware 168. Thereafter, the resultant behaviors by the virtualized device hardware 168 are monitored and/or stored in a data store (sometimes referred to as an "event log") 170.

Herein, the second set of system calls include "process-specific" system calls, namely selected system calls which may involve behaviors that are more susceptible to malicious attacks for that particular process. According to one embodiment of the disclosure, the process-specific system calls may include one or more system calls that differ from the "system-wide" system calls, and these process-specific system calls are selected for all suspicious processes. For other deployments, the process-specific system calls may include one or more system calls, different than the "system-wide" system calls, which are configurable for each type of process.

Thus, these process-specific system calls may differ, in part or in total, from one categorized process to another categorized process in order to target those system calls from different processes that may be more susceptible to malicious attack. Examples of the process-specific system calls may include, but are not limited or restricted to file management system calls; communication-based system calls; and/or other types of system calls that are hooked to identify necessary OS activity of the suspicious process for analyzing malicious behavior.

Additionally, where the detected system call is not a member of the first class or second class of system calls, instruction(s) within the second set of system calls are not handled by the virtual device hardware 168 to avoid the need for context switching. Rather, the VMM 164 merely emulates operation of the instruction(s) and returns a message to cause the VM 162₁ to resume its current process.

The monitored behaviors by the VMs 162₁-162_M and/or the virtualized device hardware 168 may be stored within the data store 170 for subsequent transfer as part of the VM-based results 172 to the object classification engine 180 (see operation 6).

According to one embodiment of the disclosure, the object classification engine 180 includes logic that is configured to receive the VM-based result 172, which include information associated with the monitored behaviors associated with processing of the suspicious object 148 with the VM(s) 162₁, . . . , and/or 162_M. Based on the VM-based results 172, the object classification engine 180 classifies the suspicious object 148 as malicious or not. According to one embodiment of the disclosure, the object classification engine 180 comprises prioritization logic 182, score determination logic 184, and comparison logic 186. The optional prioritization logic 182 may be configured to apply weighting to analysis results 174 from the static analysis engine 130 (illustrated by dashed lines) and/or the VM-based results 172.

The score determination logic 184 analyzes the VM-based results and determines (i) a probability (e.g., a score value) that the suspicious object 148 is associated with a malicious attack and/or (ii) a suspected severity of the malicious attack. The probability (score) may be included as part of the results provided to the reporting engine 190. According to one embodiment of the disclosure, the score determination logic 184 may rely on a rule-based predictive model to determine the probability (score) and/severity assigned to the suspicious object 148. Such information may be used in reporting for ordering of alerts, determining the medium or mediums of transmission of the alert from the reporting engine 190, the presentation style (font color, font size, selected image, etc.) used for the alert, or the like.

As shown in FIG. 1, the reporting engine 190 is configured to receive information from the object classification engine 180 and generate alerts. The alerts may include various types of messages that identify to a network administrator the suspicious object 148 as malicious (see operation 7). The message types may include text messages and/or email messages, video or audio stream, or other types of information over a wired or wireless communication path.

Referring to FIG. 2A, a first exemplary logical representation of the operations between a virtual machine (e.g., VM 162₁), the VMM 164 and the virtualized device hardware 168 is shown. Herein, one or more processes 200₁-200_N (N≥1) are running on the VM 162₁. For instance, process 200₁ is configured as a single or multi-threaded process to execute the suspect object 148 of FIG. 1. The process 200₁ may be assigned a process identifier (e.g., PID_1) at start time, or perhaps prior to or subsequent to execution by the VM 162₁. Each process identifier (e.g., PID_1, . . . , PID_N) may be a unique number or a unique alphanumeric string.

The VMM 164 is in communication with the VM 162₁. The VMM 164 includes a virtual machine control structure (VMCS) 210, which is a data store pre-loaded with information 215 that enables management logic 220 of the VMM 164 to intercept a system call 230 generated by process 200₁ during virtual processing of the suspicious object. The system call 230 comprises (i) one or more instructions 232, and (ii) an index 234 to one or more parameter values that are needed for execution of the instruction(s) 232.

In response to detecting and intercepting the system call 230, the VMM management logic 220 temporarily halts execution of the process 200₁ running in the VM 162₁ and passes information associated with the detected system call 230 to the VMMI 166. In fact, it is contemplated that the VM 162₁ is halted for all system calls, and thus, all processes running on the VM 162₁ are halted as well. The information associated with the detected system call 230 comprises (i) the instruction(s) 232, (ii) the index 234, and/or (iii) a process identifier 236 (e.g., PID_1) for the process 200₁ that initiated the system call 230.

According to one embodiment of the disclosure, the VMMI 166 includes classification logic 240, a first data store 250 and a second data store 260. Initially, in response to receipt of the information associated with the detected system call 230, the classification logic 240 of the VMMI 166 accesses portions of the virtualized hardware 168 to obtain a system call identifier 270 and/or parameters 275 associated with the detected system call 230. For instance, as an illustrative example, in response to receipt of signaling identifying receipt of the system call 230 by the VMM management logic 220, the VMMI 166 accesses one or more registers 282 associated with virtual processor (vCPU 280) that is part of the virtualized device hardware 168. The register(s) 282 includes the system call identifier 270, namely data that enables the VMMI 166 to identify system call type. Additionally, the VMMI 166 may access certain memory locations 292 within the virtual memory (vMemory) 290, which is part of the virtualized device hardware 168, to obtain the parameters 275 needed to complete execution of the instruction(s) 232 that are part of the system call 230. For instance, the VMMI 166 may access memory locations 292 to obtain the content of an address pointer, which is subsequently used to determine a handle for a particular file to be opened.

Additionally, the classification logic 240 accesses the first data store 250 to determine whether the process $200_1$ has been previously identified as being suspicious. According to one embodiment of the disclosure, this determination may be conducted by the classification logic 240 comparing the process identifier (PID_1) 236 of the process $200_1$ with a listing of PIDs within the first data store 250 that have been previously identified as suspicious. A process may be identified as suspicious based on the type of system calls generated by the process and/or how the process was created. For instance, where process $200_1$ has been created through a fork system call initiated by another process (e.g., process $200_N$), the first data store 250 would identify PID_1 for process $200_1$ as a suspicious process. Additionally, unless process $200_N$ is a trusted process, it is contemplated that the first data store 250 may also include PID_N to identify that process $200_N$ is suspicious as well.

When the classification logic 240 determines that the process $200_1$ has not been previously identified as being suspicious (e.g., PID_1 236 fails to match any PIDs in the first data store 250), the classification logic 240 compares the system call identifier 270, which identifies the specific system call type, against identifiers associated with a first set of system calls 262 within the second data store 260. The first set of system calls 262 includes system call identifiers for system-wide system calls.

In response to determining that the detected system call 230 is one of the system-wide system calls 262, the classification logic 240 now identifies the process (PID_1) as suspicious in the first data store 250. Additionally, the VMMI 166 provides the information associated with the detected system call 230 to the virtualized device hardware 168 for processing. The activities of the virtualized device hardware 168 are monitored by the VMMI 166 and data pertaining to these activities (e.g., state changes including changes in content within register or addressed memory, ports accessed, etc.) is stored in the event log (not shown). Thereafter, the classification logic 240 signals the VMM management logic 220 to emulate the instruction 232 by returning a message to the VM $162_1$ that causes the process $200_1$ to resume operations.

In contrast, in response to determining that the detected system call 230 is not one of the system-wide system calls 262, the classification logic 240 signals the VMM management logic 220 to emulate the instruction 232 and return a message to the VM $162_1$ that causes the process $200_1$ to resume operations.

When the classification logic 240 determines that the process $200_1$ has been previously identified as being suspicious (e.g., PID_1 236 matches a PID in the first data store 250), the classification logic 240 compares the system call identifier 270, which identifies the specific system call type, against identifiers associated with both the first set of system calls 262 and the second set of system calls 264 within the second data store 260. The second set of system calls 264 includes system call identifiers for process-specific system calls, as described above.

In response to determining that the detected system call 230 is one of the system-wide system calls 262 or one of the process-specific system calls, the classification logic 240 provides the information associated with the detected system call 230 to the virtualized device hardware 168 for processing. The activities of the virtualized device hardware 168 are monitored by the VMMI 168 and stored in the event log (not shown). Thereafter, the classification logic 240 signals the VMM management logic 220 to emulate the instruction 232 by returning a message to the VM $162_1$ that causes the process $200_1$ to resume operations.

In contrast, in response to determining that the detected system call 230 is not one of the system-wide system calls 262 or one of the process-specific system calls 264, the classification logic 240 signals the VMM management logic 220 to emulate the instruction 232 by returning a message to the VM $162_1$ that causes the process $200_1$ to resume operations.

As a secondary embodiment of the disclosure, prior to comparison of the first and second sets of system calls, the classification logic 240 may determine whether the system call identifier 270, which identifies the specific system call type, is present in a third set of system calls 266. The third set of system calls 266 operates as a "white list" to identify those system calls that should not to be passed to the virtualized device hardware 168 under any circumstance or in response to a prescribed state of operation (e.g., the virtual analysis environment exceeding certain load conditions or falling before performance thresholds). Rather, the classification logic 240 signals the VMM management logic 220 to emulate the instruction 232 by returning a message to the VM $162_1$ that causes the process $200_1$ to resume operations.

Referring to FIG. 2B, a second exemplary logical representation of the operations between the VM $162_1$, the VMM 164 and the virtualized device hardware 168 is shown. Similar to FIG. 2A, one or more processes $200_1$-$200_N$ (N≥1) are running on the VM $162_1$, where the process $200_1$ is assigned PID_1 as its process identifier.

In response to detecting and intercepting the system call 230, the VMM management logic 220 temporarily halts execution of the process $200_1$ running in the VM $162_1$ and passes information associated with the detected system call 230 to the VMMI 166. The information associated with the detected system call 230 comprises (i) one or more instructions 232, (ii) the index 234, and/or (iii) the process identifier 236 (e.g., PID_1) for the process $200_1$ that initiated the system call 230.

It is contemplated that VMM management logic 220 may be configured to halt the VM $162_1$ in response to detecting the system call 230. This halts all of the processes running on the VM $162_1$. Where the VM $162_1$ includes multiple virtual processors (e.g., multiple vCPUs), for a process running on a first vCPU and initiating a system call during an analysis of an object, the second vCPU is also halted to avoid changing data within the virtual memory.

According to one embodiment of the disclosure, in response to receipt of the information associated with the detected system call 230, the classification logic 240 of the VMMI 166 accesses portions of the virtualized hardware 168 to obtain the system call identifier 270 and/or parameters 275 associated with the detected system call 230, as described above. Additionally, the classification logic 240 accesses the first data store 250 to determine whether the process $200_1$ has been previously identified as being suspicious, as described above.

When the classification logic 240 determines that the process $200_1$ has not been previously identified as being suspicious (e.g., PID_1 236 fails to match any PIDs in the first data store 250), the classification logic 240 compares the system call identifier 270 against identifiers associated with the first set of system calls 262 within the second data store 260, namely the system-wide system calls, as described above.

In response to determining that the detected system call 230 is one of the system-wide system calls 262, the classification logic 240 now identifies the process (PID_1) as suspicious in the first data store 250. Additionally, the VMMI 166 provides the information associated with the detected system call 230 to the virtualized device hardware 168 for processing. The activities of the virtualized device hardware 168 are monitored by the VMMI 166 and data pertaining to these activities is stored. Thereafter, the classification logic 240 signals the VMM management logic 220 to emulate the instruction 232 by returning a message to the VM $162_1$ that causes the process $200_1$ to resume operations.

In contrast, in response to determining that the detected system call 230 is not one of the system-wide system calls 262, the classification logic 240 signals the VMM management logic 220 to emulate the instruction 232 and return a message to the VM $162_1$ that causes the process $200_1$ to resume operations.

When the classification logic 240 determines that the process $200_1$ has been previously identified as being suspicious (e.g., PID_1 236 matches a PID in the first data store 250), the classification logic 240 compares the system call identifier 270, which identifies the specific system call type, against identifiers associated with both the first set of system calls 262 and the second set of system calls 264 within the second data store 260. The second set of system calls 264 includes system call identifiers for process-specific system calls, as described above.

However, with respect to comparison of the system call identifier 270 identifiers associated with the second set of system calls 264 within the second data store 260, the classification logic 240 may PID_1 or other data associated with the process $200_1$ in order to identify a particular category for the process $200_1$ (e.g., network connectivity, file management, etc.). After associating the process $200_1$ to a particular process category, the system call identifier is compared to those identifiers associated with system calls selected for that particular process category. As a result, a first process category 268 (e.g., network connectivity) may include a first subset of system calls, which may be more prone for use in malicious attacks against network connection-based processes than a second subset of system calls assigned to a second process category 269 (e.g., file management).

It is contemplated that the granularity of the process categories may be adjusted to achieve desired performance for the network appliance. For instance, the first process category 268 may be directed to system calls that are typically used for malicious attacks against Microsoft® Internet Explorer® browser applications while another process category may be directed to a different type of browser application. Additionally, another process category 269 may be directed to system calls that are more commonly used for malicious attacks against Portable Document Format (PDF) reader applications. Hence, the system calls for one process category may vary from system calls for another process category.

In contrast, in response to determining that the detected system call 230 is not one of the system-wide system calls 262 or one of the process-specific system calls 264, the classification logic 240 signals the VMM management logic 220 to emulate the instruction 232 by returning a message to the VM $162_1$ that causes the process $200_1$ to resume operations.

III. EXEMPLARY LOGICAL LAYOUT

Figure 3:
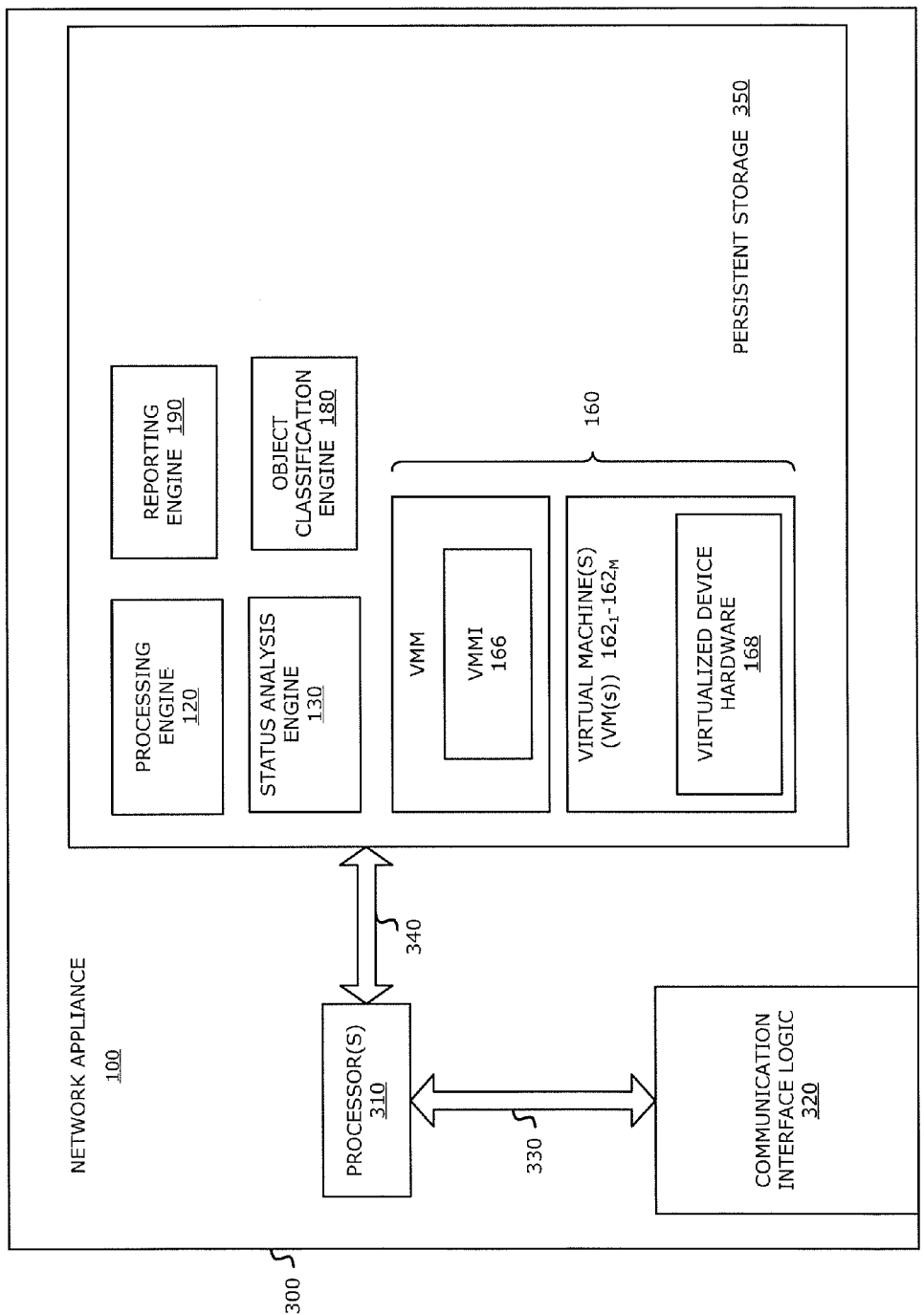
FIG. 3 is an exemplary embodiment of a logical representation of the network appliance of FIG. 1.

Referring now to FIG. 3, an exemplary embodiment of a logical representation of the network appliance 100 is shown. The network appliance 100 includes a housing 300, which is made entirely or partially of a hardened material (e.g., hardened plastic, metal, glass, composite or any combination thereof) that protect circuitry within the housing 300, namely one or more processors 310 that are coupled to communication interface logic 320 via a first transmission medium 330. Communication interface logic 320 enables communications with external network devices and/or other network appliances to receive updates for the VMM 164. According to one embodiment of the disclosure, communication interface logic 320 may be implemented as a physical interface including one or more ports for wired connectors. Additionally, or in the alternative, communication interface logic 320 may be implemented with one or more radio units for supporting wireless communications with other electronic devices.

Processor(s) 310 is further coupled to persistent storage 350 via transmission medium 340. According to one embodiment of the disclosure, persistent storage 350 may include (a) processing engine 120; (b) static analysis engine 130; (c) the dynamic analysis engine 160, which includes one or more VMs 1621-162M and the VMM 164; (d) object classification engine 180; and (e) reporting engine 190. Of course, when implemented as hardware, one or more of these logic units could be implemented separately from each other.

Collective logic within the dynamic analysis engine 160 may be configured to detect a system call during processing of an object by one or more virtual machines and classify the detected system call. The assigned classification may be used to control whether or not the handling of the detected system call is conducted by virtualized device hardware targeted by the system call to enhance overall performance of the network appliance.

IV. SELECTIVE SYSTEM CALL MONITORING OPERABILITY

Figure 4:
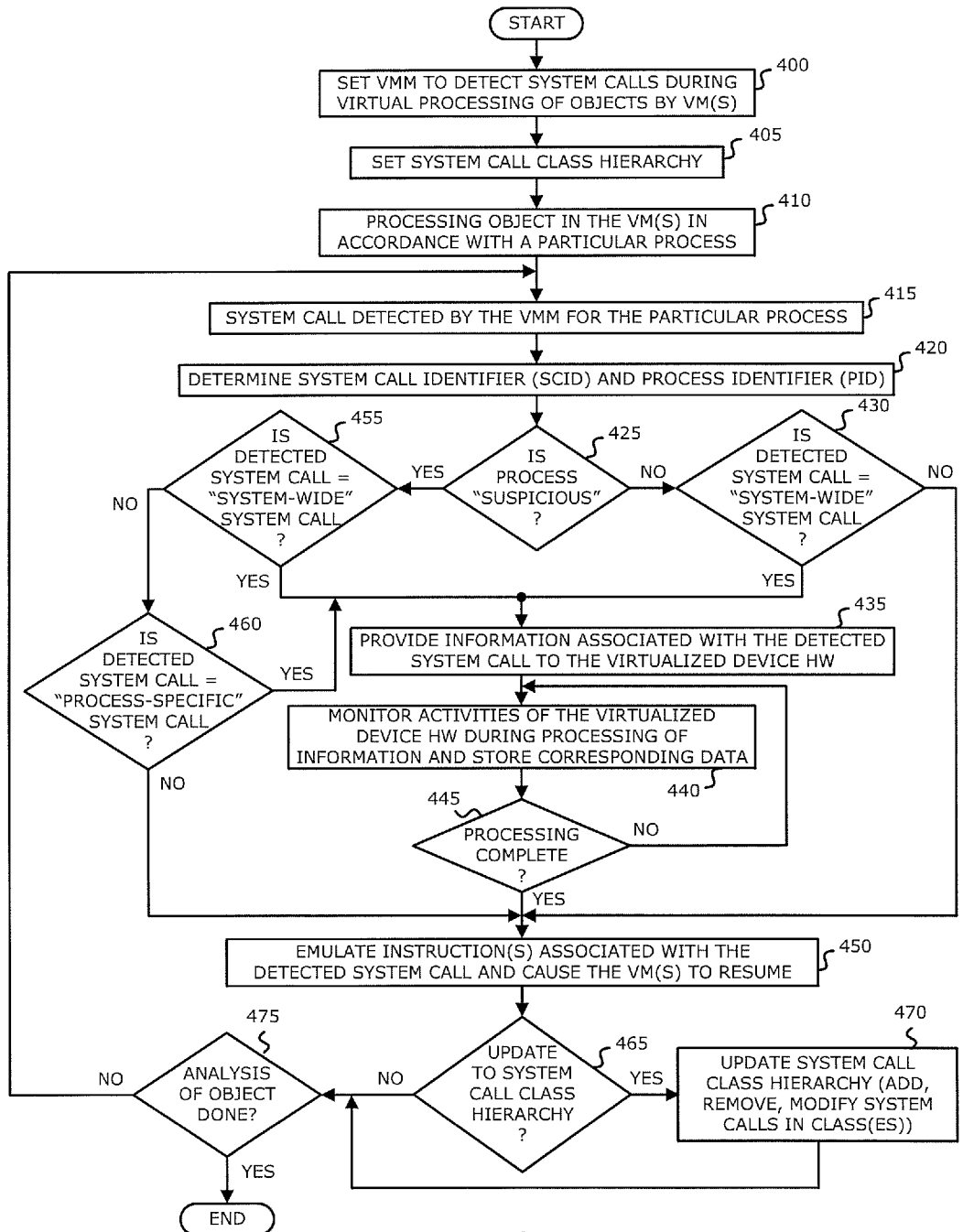
FIG. 4 is an illustrative embodiment of the operations conducted in accordance with the selective system call tracing.

Referring to now FIG. 4, an illustrative embodiment of the operations conducted in accordance with the selective system call monitoring is shown. Herein, the VMM is set to detect system calls during virtual processing of objects by one or more VMs managed by the VMM (block 400). Additionally, a class hierarchy for system calls is set (block 405). As an illustrative example, one of the classes may identify system-wide system calls that include a set of system calls that tend to occur during malicious attacks, but are less processing intensive and/or less frequently initiated than other types of system calls. Another class may identify process-specific system calls that include a set of system calls that may be more susceptible to malicious attacks for one or more particular processes.

During processing of a received object by a particular process running on a VM, a system call is detected by the VMM (blocks 410 and 415). Thereafter, the system call identifier for the detected system call and the process identifier (PID) for the process that initiated the detected system call are determined (block 420).

Based on the PID, a determination is made whether the process has been previously identified as suspicious (block 425). If not, a determination is made whether the detected system call is one of the system-wide system calls (block 430). If the detected system call is one of the system-wide system calls, the information associated with the detected system call (e.g. instruction(s), parameters used in execution of the instruction(s), etc.) is provided to the virtualized device hardware (block 435). Then, the activities that occur during the processing of the information are monitored and the data associated with the activities (e.g., state changes including changes in content within register or addressed memory, ports accessed, etc.) is stored (block 440). Thereafter, the instruction(s) associated with the detected system call is emulated by generating a message for the VM to resume operations (blocks 445 and 450).

Alternatively, if the process has been previously identified as suspicious, a determination is made whether the detected system call is either one of the system-wide system calls or one of the process-specific system calls (blocks 455 and 460). If the detected system call is one of the system-wide system calls or one of the process-specific system calls, the information associated with the detected system call is provided to the virtualized device hardware, activities that occur during the processing of the information is monitored, and the resultant data is stored (blocks 435 and 440). Thereafter, the instruction(s) associated with the detected system call is emulated by generating a message for the VM to resume operations (blocks 445 and 450).

Once virtual processing of the object is complete, a determination may be made as to whether any system call classes require an update (block 465). If so, the class hierarchy for system calls is updated and the selective system call monitoring operations continue (block 470).

In the foregoing description, the invention is described with reference to specific exemplary embodiments thereof. It will, however, be evident that various modifications and changes may be made thereto without departing from the broader spirit and scope of the invention as set forth in the appended claims. For instance, the selective system call monitoring may be conducted on system calls generated by logic outside the guest image.

What is claimed is:

1. A computerized method performed by a network appliance, comprising:
   determining, by the network appliance including one or more hardware processors, whether a detected system call, which is generated by a process that is executing an object within a virtual machine, belongs to a first class of system calls by at least
   halting operations by the virtual machine in response to the detected system call,
   determining that there exists a prescribed level of likelihood that the process is associated with a malicious attack that identifies the process is suspicious,
   responsive to determining that the process is not suspicious, comparing the identifier for the detected system call to each identifier for a first plurality of system calls that are part of the first class of system calls, and subsequently determining that the process is associated with a malicious attack by determining that the detected system call belongs to the first class of system calls upon successfully comparing the identifier for the detected system call to a first identifier for one of the first class of system calls; and
   providing information associated with the system call to virtualized device hardware in response to determining that the system call is associated with the first class of system calls.

2. The computerized method of claim 1, wherein prior to determining whether the detected system call initiated by the virtual machine belongs to the first class of system calls, the method further comprises configuring a virtual machine monitor (VMM) to detect system calls initiated by the virtual machine.

3. The computerized method of claim 1, wherein the determining whether the detected system call belongs to the first class of system calls comprises:
   accessing one or more data stores within the virtualized device hardware while the virtual machine is halted from operation to determine the identifier for the detected system call; and
   comparing the identifier for the detected system call to each identifier for a plurality of system calls that are part of the first class of system calls.

4. The computerized method of claim 3, wherein prior to determining whether the detected system call initiated by the virtual machine belongs to the first class of system calls, the method further comprises configuring a virtual machine monitor (VMM) to detect system calls initiated by the virtual machine.

5. The computerized method of claim 1, further comprising
   in lieu of providing information associated with the system call to the virtualized device hardware, resuming processing of the object by the process running on the virtual machine in response to determining that the system call differs from the first class of system calls.

6. The computerized method of claim 5, wherein the first class of system calls includes system-wide system calls and the second class of system calls includes process-specific system calls.

7. The computerized method of claim 6, wherein the second class of system calls includes a first subset of system calls for the process and a second subset of system calls for a second process different than the process.

8. The computerized method of claim 1, wherein the virtualized hardware device includes (i) one or more registers of a virtual processor or (ii) a virtualized memory.

9. The computerized method of claim 1, wherein the first class of system calls includes system-wide system calls that represent selected system calls that occur during malicious attacks, but are less processing intensive and/or less frequently initiated than other types of system calls.

10. The computerized method of claim 1, wherein the first class of system calls includes a system call that initiates a second process different from the process.

11. The computerized method of claim 1, wherein the process is a software component initiating the detected system call during execution of the object, the software component including (i) an application or (ii) an operating system.

12. The computerized method of claim 11, wherein the application includes a web browser.

13. The computerized method of claim 1, wherein the process includes the object that initiates the detected system call.

14. A computerized method for determining whether a detected system call that is generated by a process executing an object on a virtual machine is potentially associated with a malicious attack, the method comprising:
   halting operations by the virtual machine executed by a network appliance including one or more hardware processors, in response to detecting the system call;
   determining an identifier for the system call;
   determining whether a prescribed level of likelihood exists that the process is associated with a malicious attack that identifies the process is suspicious;

responsive to determining that the process is not suspicious, comparing the identifier for the system call to each identifier for a first plurality of system calls that are part of a first class of system calls and a second class of system calls different than the first class of system calls; and determining that the system call belongs to one of the first class of system calls and the second class of system calls upon successfully comparing the identifier for the system call to a first identifier for one of the first class of system calls and the second class of system calls.

15. The computerized method of claim 14 further comprising:

providing information associated with the system call to virtualized device hardware in response to determining that the system call is associated with either the first class of system calls or the second class of system calls.

16. The computerized method of claim 15, wherein the virtualized device hardware includes a virtual memory from which parameters needed to complete execution of one or more instructions that are part of the system call.

17. The computerized method of claim 15, wherein the determining whether the prescribed level of likelihood exists, the comparing of the identifier for the system call, and the determining that the system call belongs to one of the first class of system calls and the second class of system calls is performed by a virtual machine monitor.

18. The computerized method of claim 15, wherein the determining whether the prescribed level of likelihood exists, the comparing of the identifier for the system call, and the determining that the system call belongs to one of the first class of system calls and the second class of system calls is performed by a virtual machine memory inspection (VMMI) logic that is part of a virtual machine monitor.

19. The computerized method of claim 14, wherein the first class of system calls includes a system call that initiates a second process different from the process.

20. The computerized method of claim 14, wherein the process is a software component initiating the detected system call during execution of the object, the software component including (i) an application or (ii) an operating system.

21. The computerized method of claim 20, wherein the application includes a web browser.

22. The computerized method of claim 14, wherein the process includes the object that initiates the detected system call.

23. A computerized method comprising:

detecting a system call initiated by a virtual machine executed by a network appliance including one or more hardware processors, the detecting of the system call comprises halting operations by the virtual machine in response to detecting the system call, determining an identifier for the system call, determining that there exists a prescribed level of likelihood that a process running on the virtual machine and processing an object is associated with a malicious attack to identify that the process is suspicious, responsive to determining that the process is not suspicious, comparing the identifier for the system call to each identifier for a first plurality of system calls that are part of a first class of system calls, and determining that the system call belongs to the first class of system calls upon successfully comparing the identifier for the system call to a first identifier for one of the first plurality of system calls;

providing information associated with the system call to virtualized device hardware in response to determining that the system call is associated with the first class of system calls; and resuming processing of an object by the virtual machine without providing information associated with the system call to the virtualized device hardware in response to determining that the system call is associated with a second class of system calls that is different from the first class of system calls.

24. The computerized method of claim 23, wherein the detecting of the system call comprises configuring a virtual machine monitor (VMM) to detect system calls initiated by the virtual machine.

25. The computerized method of claim 23, wherein the determining whether the system call belongs to the first class of system calls comprises:

accessing one or more data stores within the virtualized device hardware while operations of the virtual machine are halted to determine an identifier for the system call; and comparing the identifier for the system call to each identifier for a plurality of system calls that are part of the first class of system calls.

26. The computerized method of claim 23, wherein prior to determining the class assigned to the system call, the method further comprises configuring a virtual machine monitor (VMM) to detect system calls initiated by the virtual machine.

27. The computerized method of claim 23, wherein the first class of system calls includes system-wide system calls and the second class of system calls includes process-specific system calls.

28. The computerized method of claim 23, wherein the second class of system calls includes a first subset of system calls for the process and a second subset of system calls for a second process different than the process.

29. An apparatus comprising:

one or more processors; and a memory coupled to the one or more processors, the memory comprises software that, when executed by the one or more processors, generates (1) a virtual machine including a process that executes an object and initiates a system call during processing of the object, and (2) a virtual machine monitor that (a) detects the system call initiated by the virtual machine, (b) determines a class assigned to the detected system call by at least comparing an identifier for the detected system call to each identifier for a first plurality of system calls that are part of a first class of system calls in response to failing to determine that the process is suspicious based on activities of the process failing to suggest that the process is associated with a malicious attack, (c) provides information associated with the system call to virtualized device hardware in response to determining that the system call is associated with the first class of system calls, and (d) resumes processing of the object by the virtual machine providing the information to the virtual device hardware in response to determining that the system call is associated with a second class of system calls that is different from the first class of system calls.

30. The apparatus of claim 29, wherein the determining of the class assigned to the detected system call by the virtual machine monitor comprises:
- halting operations by the virtual machine in response to detecting the system call;
- accessing one or more data stores within the virtualized device hardware while operations of the virtual machine are halted to determine the identifier for the detected system call; and
- comparing the identifier for the detected system call to each identifier for a plurality of system calls that are part of the first class of system calls.

31. The apparatus of claim 29, wherein the determining of the class assigned to the detected system call by the virtual machine monitor further comprises:
- halting operations by the virtual machine in response to detecting the system call;
- accessing one or more data stores within the virtualized device hardware while operations of the virtual machine are halted to determine the identifier for the detected system call;
- determining that the process is suspicious when there exists a prescribed level of likelihood that the process running on the virtual machine is associated with a malicious attack;
- responsive to determining that the process is not suspicious, comparing the identifier for the detected system call to each identifier for the first plurality of system calls that are part of the first class of system calls; and
- determining that the detected system call belongs to the first class of system calls upon successfully comparing the identifier for the detected system call to a first identifier for one of the first class of system calls.

32. The apparatus of claim 29, wherein the first class of system calls includes system-wide system calls and the second class of system calls includes process-specific system calls that are different from system-wide system calls.

33. The apparatus of claim 29, wherein the first class of system calls includes a system call that initiates a second process different from the process.

34. The apparatus of claim 29, wherein the process running on the virtual machine is a software component that initiates the detected system call, the software component including (i) an application or (ii) an operating system.

35. The apparatus of claim 34, wherein the application includes a web browser.

36. The apparatus of claim 29, wherein the process running on the virtual machine includes the object that initiates the detected system call.

37. A non-transitory computer readable medium that includes software that, when processed by one or more processor, performs operations comprising:
- detecting a system call initiated by a virtual machine that is included as part of the software and is being executed by the one or more processors;
- responsive to determining that the system call is not malicious, determining a class assigned to the detected system call by at least comparing an identifier for the detected system call to each identifier for a first plurality of system calls that are part of a first class of system calls;
- providing information associated with the system call to virtualized device hardware in response to determining that the system call is associated with the first class of system calls; and
- resuming processing of an object by the virtual machine without providing information associated with the system call to the virtualized device hardware in response to determining that the system call is associated with a second class of system calls that is different from the first class of system calls.

* * * * *